United States Patent
Sela et al.

(10) Patent No.: US 9,641,208 B2
(45) Date of Patent: May 2, 2017

(54) COVER FOR MOBILE DEVICE WITH ECOLOGICAL LIGHTER

(71) Applicant: Sagi Sela, Holon (IL)

(72) Inventors: Sagi Sela, Holon (IL); Eli Sharipov, Holon (IL); Shalva Amshikashvili, Holon (IL)

(73) Assignee: Sagi Sela, Holon (IL)

( * ) Notice: Subject to any disclaimer, the term of this patent is extended or adjusted under 35 U.S.C. 154(b) by 0 days.

(21) Appl. No.: 14/404,456

(22) PCT Filed: Apr. 22, 2013

(86) PCT No.: PCT/IB2013/053166
§ 371 (c)(1),
(2) Date: Nov. 27, 2014

(87) PCT Pub. No.: WO2013/179154
PCT Pub. Date: Dec. 5, 2013

(65) Prior Publication Data
US 2015/0141093 A1    May 21, 2015

Related U.S. Application Data

(60) Provisional application No. 61/652,890, filed on May 30, 2012.

(51) Int. Cl.
*H04M 1/00* (2006.01)
*H04B 1/3888* (2015.01)
(Continued)

(52) U.S. Cl.
CPC ............ *H04B 1/3888* (2013.01); *F23Q 2/32* (2013.01); *F23Q 2/36* (2013.01); *F23Q 7/16* (2013.01);
(Continued)

(58) Field of Classification Search
CPC ............ H40M 1/00; H04M 1/02; H04M 1/11; H04M 1/21
(Continued)

(56) References Cited

U.S. PATENT DOCUMENTS 5,354,968 A    10/1994  Yamamura
7,373,183 B2 *  5/2008  Brudos ................... 455/572
(Continued)

FOREIGN PATENT DOCUMENTS

CN    201163998 Y  * 12/2008
CN    201332417      10/2009
(Continued)

OTHER PUBLICATIONS

Newfrog, IPhone4/4S Collection/Newfrog, Special Stylish Hard Cigarette Fire Lighter Case Cover for IPhone 4/4S, www.newfrog.com/c/cases - skins - 515.html, pp. 1-6 + website link page with date (separate).*

(Continued)

*Primary Examiner* — Alejandro Rivero
*Assistant Examiner* — Angelica M Perez
(74) *Attorney, Agent, or Firm* — Mark M. Friedman (57) ABSTRACT

A portable electric cigarette lighter or mobile device accessory with integrated portable electric cigarette lighter, the mobile device accessory including: (a) a protective accessory for a mobile device; (b) an electric lighter mechanism integrated into the protective accessory, the lighter mechanism including: (i) a heating element, (ii) a power source, (iii) an actuator, adapted to activate the heating element by operationally coupling the heating element to the power source and (d) a slide shutter adapted to reversibly expose the heating element.

13 Claims, 7 Drawing Sheets (51) Int. Cl.
*G06F 1/16* (2006.01)
*G06F 1/18* (2006.01)
*F23Q 7/16* (2006.01)
*H04M 1/18* (2006.01)
*H04M 1/21* (2006.01)
*F23Q 2/32* (2006.01)
*F23Q 2/36* (2006.01)
*A45C 15/00* (2006.01)
*A45C 11/00* (2006.01)

(52) U.S. Cl.
CPC ............ *G06F 1/1626* (2013.01); *G06F 1/181* (2013.01); *H04M 1/185* (2013.01); *H04M 1/21* (2013.01); *A45C 15/00* (2013.01); *A45C 2011/002* (2013.01); *G06F 2200/1633* (2013.01)

(58) Field of Classification Search
USPC ............ 455/675.8, 349, 556.1, 575.1; 361/264–265; 219/267, 270, 260; D14/250; 431/132, 135
See application file for complete search history.

(56) References Cited

U.S. PATENT DOCUMENTS

| | | | |
|---|---|---|---|
| 8,954,117 B2* | 2/2015 | Huang | H04B 1/3883 455/343.6 |
| 2011/0136555 A1* | 6/2011 | Ramies | B67B 7/16 455/575.8 |
| 2013/0220847 A1* | 8/2013 | Fisher | B65D 25/005 206/216 |

FOREIGN PATENT DOCUMENTS

| | | | |
|---|---|---|---|
| DE | 202005003817 | * | 5/2005 |
| DE | 202005003817 U1 | | 5/2005 |
| DE | 102008 | * | 7/2009 |

OTHER PUBLICATIONS

Designboom, The First Mobile Phone with Cigarette Lighter, http://www.designboom.com/technology/ the- first-mobile-phone-with-a-cigarette-lighter/, pp. 5-7.*

* cited by examiner

FIGURE 6A front

FIGURE 6B right

FIGURE 7A front

124
Slide carrige

FIGURE 7B

124
Slide carrige

COVER FOR MOBILE DEVICE WITH ECOLOGICAL LIGHTER

This patent application claims priority from and the benefit of U.S. Provisional Patent Application No. 61/652,890, filed May 30, 2012

FIELD AND BACKGROUND OF THE INVENTION

The present invention relates to a cover for a handheld mobile device and, more particularly, to a [cigarette] lighter can be integrated into the cover/guard of the mobile device.

As technology has developed, the cellular phone and mobile devices have likewise developed in leaps and bounds. Today, the cell-phone, or more accurately the smart-phone, is an extremely sophisticated hi-tech device which includes many components (both hardware and software) which are intended to make day-to-day living much easier.

Mobile devices today, and in particular smart-phones and tablets, provide users with additional features such as cameras (picture and video), flashlight, alarm clock, GPS, datebook, etc.

As the smart-phones, tablets, handheld electronic readers, handheld computing devices etc. have developed, and due to their inherent fragility, an additional market for screen protectors and covers or cases for the devices has developed. The function of the cases or covers is primarily to protect the device from breakage, such as, for example, due to a fall. Additionally, the case can give the phone a somewhat unique look as well as providing extra space for carrying papers, tickets, money and the like. The case usually provides a means for attaching the case to belt or bag or pocket to device. Pocketbook or wallet cases are widely available. Anti-radiation cases include protective layer to insulate cell-phone radiation. Many 'gag' accessories have appeared on the market, such as a life-like hand attached to the mobile phone cover which the user appears to be holding when speaking on the device. Even bottle-openers have been included in various cases. Some cases provide a waterproofing function. Others provide holders for wireless keyboards and the like.

It would be highly advantageous to have a case/cover for a mobile device that incorporates an ecological or "green" electric cigarette lighter with the case/cover.

A mobile device, as referred to herein, refers to all types of mobile communication devices, including but not limited to, cellular phone, satellite phones, Wi-Fi based phone (e.g. VoIP phones), smart-phones, tablets, iPads™, audio and audio/visual players, mobile play stations, game consoles and the like.

A mobile device case is a protective accessory for a mobile device which is adapted to house a mobile device in such a manner that the device can be removed from—and replace in—the accessory during regular use (e.g. removing the device to answer a call and replacing the device in the case after terminating the call). Cases generally have slightly larger dimensions than the mobile devices intended to be housed therein. The larger case allows the mobile device to be removed and replaced without significant hindrance, although in some situations it can be difficult to remove a device from the case. Some cases are designed to restrict the movement of the device therein and therefore the user needs to exert a pertinent amount of energy to remove the device from the case.

A mobile device cover is a protective accessory for a mobile device which is usually fitted, and in some cases adhered, to the mobile device in a manner such that the mobile device is used while still housed in the cover, during regular use. The cover is intended to fit the contours and dimensions of the mobile device without blocking apertures such as jacks, speaker and microphone holes, charging ports/jacks or obstructing sensors, LEDs or camera lenses. Some covers cover the buttons of the device whereas other covers do not. Covers can be removed and replaced, but are not intended for such use on a regular, ongoing basis.

SUMMARY OF THE INVENTION

According to the present invention there is provided a mobile device accessory with integrated portable electric cigarette lighter including: (a) a protective accessory for a mobile device; (b) an electric lighter mechanism integrated into the protective accessory, the lighter mechanism including: (i) a heating element, (ii) a power source, and (iii) an actuator, adapted to activate the heating element by operationally coupling the heating element to the power source.

According to further features in preferred embodiments of the invention described below the power source is an independent power source.

According to still further features in the described preferred embodiments the power source is a power source of a mobile device encased in the protective accessory.

According to still further features the independent power source is selected from the group including: a rechargeable battery, a non-rechargeable battery, a solar powered battery, and a combination of any of the above. According to still further features the protective accessory is a carry case.

According to still further features the protective accessory is a mobile device cover.

According to still further features the lighter mechanism further includes: (iv) a slide shutter adapted to reversibly expose the heating element.

According to still further features the slide shutter is further adapted to actuate the actuator when exposing the heating element.

According to still further features the slide shutter is further adapted to actuate the actuator when hiding the heating element from view.

According to still further features the actuator is a slide shutter adapted to reversibly expose the heating element.

According to still further features the lighting mechanism further includes: (iv) a power port, adapted to receive a line from a power source to charge the independent power source.

According to still further features the power port is further adapted to charge a power source of a mobile device encased in the protective accessory.

According to still further features the power port is selected from the group comprising: a mini Universal Serial Bus (USB) port and a micro USB port.

According to still further features the mobile device accessory further includes: (c) a coupling mechanism adapted to couple the power source of the encased mobile device to the heating element.

According to still further features the lighting mechanism is housed in a housing operationally coupled to the protective accessory.

According to another embodiment there is provided a portable electric cigarette lighter, including: (a) a heating element; (b) a power source; (c) an actuator, adapted to activate the heating element by operationally coupling the heating element to the power source; and (d) a slide shutter adapted to reversibly expose the heating element.

According to further features the portable electric cigarette lighter further includes (e) a power port, adapted to receive a power line to charge the power source.

The present invention successfully addresses the shortcomings of the presently known configurations by providing at least some of the following benefits:

Making day-to-day living easier for the consumer.

Negating the necessity for carrying around a lighter in addition to other accessories.

Environmental conservation by reducing the amount of plastic produced in the manufacture of lighters.

Swapping over to "green energy" as opposed to combustion-based energy for lighters.

The mobile phone/device becomes a survival tool, when necessary, for surviving in nature—even in high moisture conditions.

The lighter accessory negates to constant need to buy new lighters, which adds a constant expense to smokers. The innovative lighter is an ecological (electrical) lighter that works on a filament or any other heating element which allows lighting a cigarette it even when there is wind, as opposed to lighter that works on gas.

The target group for accessory—all mobile device users, especially those who smoke.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of a case for a mobile device with an integrated electric lighter according to the present invention, may be better understood with reference to the drawings and the accompanying description.

In some embodiments, the heating element is connected to a slide or button which, when actuated, activates the heating element. In other embodiments the heating element is exposed immediately upon activation. In still other embodiments, the element is automatically exposed only once the desired temperature has been reached.

The arrangement of the aforementioned embodiments can be either manual, automatic or mechanical. An example of a manual arrangement is depicted in FIGS. 1-8 and discussed in further detail below. In the depicted embodiment, a slide shutter (best seen in FIG. 3A and shown separately in FIGS. 6A-D) is adapted to be manually moved by a user to expose a heating element, whereby exposing the element coincides with activating the element (discussed in greater length below). An example of an automatic arrangement is where a button is provided (not shown) for activating the heating element. Once the button is actuated, a temperature control unit (not shown) monitors the temperature of the element and automatically draws back the shutter once the desired temperature has been reached. Alternatively, a slide mechanism may be located within the cover and be manually or automatically slid into view for use.

An example of a mechanical arrangement is an arrangement similar to the arrangement of a car lighter. A car lighter works on a principle of mechanical thermostatic action. The handle has a spring that is compressed when pushed in. Pushing the handle in also causes tabs in the top half of the "barrel" of the lighter to "lock" into slots in the bottom half of the barrel and pushes the heating element against the "hot" electrical contact point in the base of the lighter receptacle. As the element heats up, the bottom half of the barrel also heats up which causes the slot openings to expand. The top of the barrel is released as the tabs loose contact with the expanding barrel and the spring pushes the lighter back to the original position, losing contact with the electrical point and 'popping' up when ready.

In the immediate invention, a similar mechanism can be employed according to two exemplary configurations. In the first configuration the inside face of the shutter houses the contact point which heats the element. The exposed state (such as the state of the apparatus depicted in FIG. 3A) is the initial state. The element is heated by sliding the shutter over the element. The shutter is spring-loaded. Tabs (not shown) slot into corresponding grooves (not shown) and hold the shutter in the covered or closed state. As the element heats up, the grooves expand away from the tabs and the shutter snaps back to the initial, exposed, state. The element is now hot and ready for use.

In the second configuration, the covered state is the initial state. The shutter is spring-loaded. Tabs (not shown) slot into corresponding grooves (not shown) and hold the shutter in the covered state as described for the first configuration. A button, slide or other actuator (not shown) activates the heating process. The electric/power contact point is housed on the inside face of the shutter. (In other embodiments the contact point is housed elsewhere and activated or brought into contact with the element when the button, slide or actuator is actuated.) As the element heats up, the grooves expand away from the tabs and the shutter snaps open to the exposed state. The element is now hot and ready for use. The slide can be returned to the initial closed stated after the lighter has been used to prevent accidental damage from the hot element. Other variations, modifications and considerations would be obvious to one skilled in the art.

Power Source

The energy/power source for the lighter may be independent or coupled to the power source of the device in a unidirectional or bi-directional manner.

Numerous embodiments are envisioned for the configuration of the invention which includes an independent power source. As long as the independent power source is charged, the heating element can be heated with or without the mobile device being present in the case or cover. This point is moot according to the embodiment wherein the innovative lighter is integrated into a cover (e.g. such as cover 10 depicted in the accompanying Figures) which is constantly in contact with the mobile device, under normal circumstances (i.e.

when the cover has not been removed for some reason). Although, in the embodiment of a mobile device cover, the lighting mechanism may or may not have an independent power source.

In one embodiment of the invention, the independent power source is a non-rechargeable battery. In other embodiments, the power source is a rechargeable battery. In one embodiment, the rechargeable battery is charged in a conventional charger connected to the local power outlet. In another embodiment, the battery is charger in-place via a power cord connected to a power source such as a local power outlet or a computer/laptop (e.g. via a USB cable). In yet another embodiment, the independent power source is charged by solar panels (not shown) located on the case or cover.

In a preferred embodiment, the battery is charged and/or powered by the mobile device housed in the case/cover. In one embodiment a connector piece in the case connects the power source of the mobile device housed therein to the rechargeable battery. In another embodiment the rechargeable battery is charged on-contact with the power source of the mobile device. In yet another embodiment, a dual purpose power jack connects to the power source of the mobile device while housed in the case or cover and is further more adapted to receive the power cord jack of the mobile device, allowing both the mobile device and the rechargeable battery to be charged simultaneously.

In another configuration, the case/cover does not include an independent power source. Without an independent power source, the electric lighter is powered by the power source of the mobile device housed therein and can only be activated when the mobile device is present.

In any of the aforementioned configurations and embodiments, the power flow may be unidirectional (i.e. from the power source [e.g. of the mobile device] to the power cell of the innovative case) or bidirectional (i.e. either device can from power from the other power source). Any feasible combination of any of the aforementioned features may be combined into a single embodiment of the innovative case.

In preferred embodiments, the element is covered while heating to both speed up the process as well as protect the user from inadvertently burning themselves. To this end, the shutter or a similar cover is preferably made of non-conductive and/or heat resistant material that is sufficiently rugged so as not to burn, buckle, bend or otherwise become deformed during use. In some embodiment, indicating lights or chemical low-tech indicators are used to indicate the "heating" and "ready" statuses.

Figure 1:
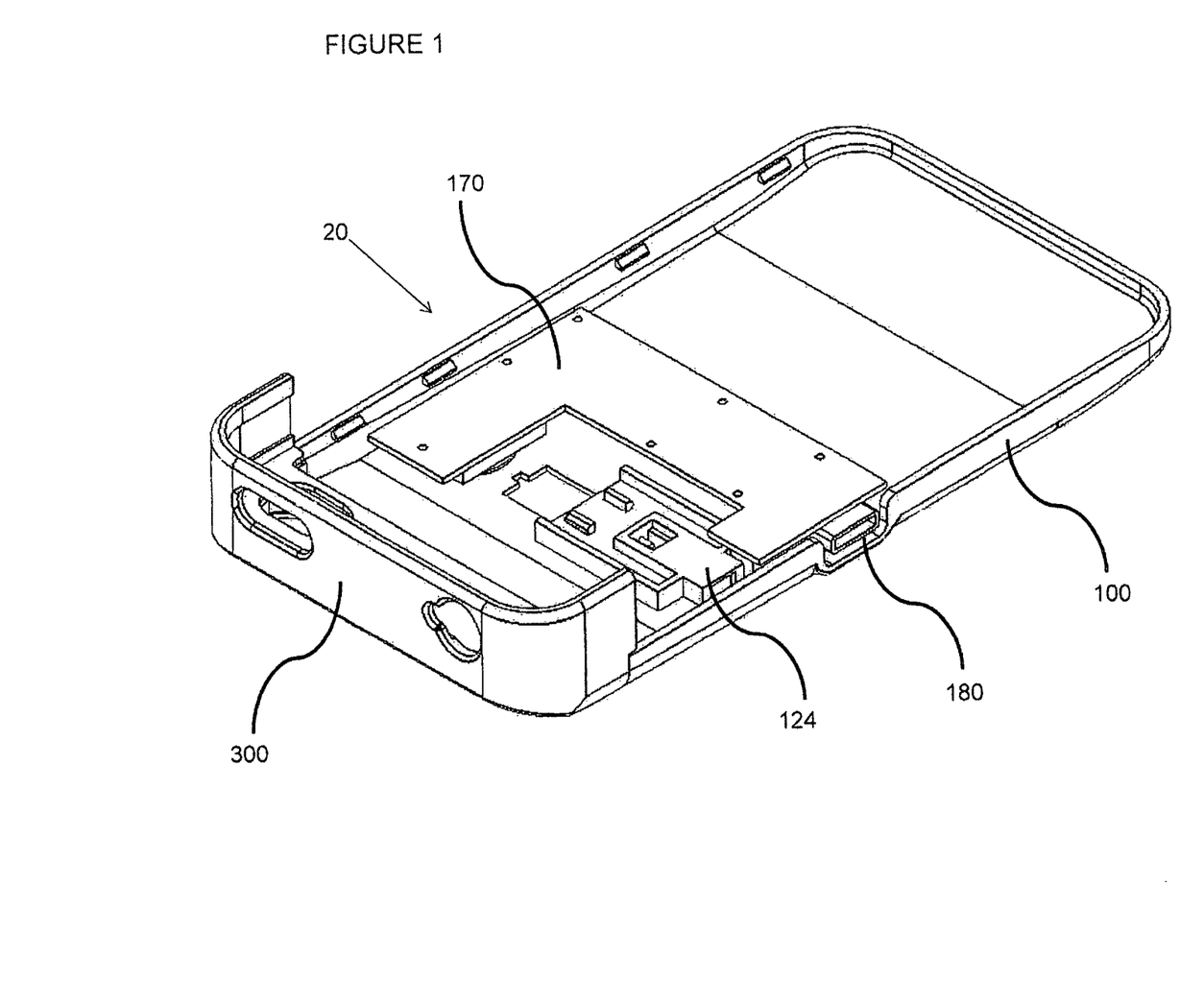
FIG. 1 is an isometric front view of a back panel of an embodiment of the invention.

Reference is now made to the drawings, which depict an exemplary yet preferred embodiment of the invention. FIG. 1 illustrates an isometric front view of a back panel 100 of an embodiment of the immediate invention which is a cover for a smartphone with an integrated electric lighter.

Figure 2A:
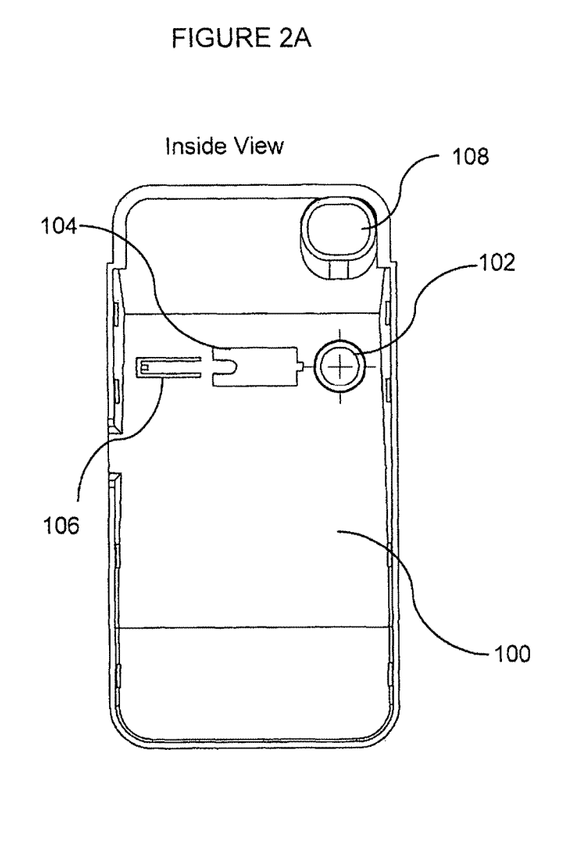
FIG. 2A is an inside view of the back panel of FIG. 1 without the innovative mechanism.

FIG. 2A illustrates an inside view of back panel 100 of FIG. 1 without the innovative mechanism. In the Figure, only the pre-molded form of back cover 100 is visible, with apertures for the various components. A standard camera aperture 108 is situated in the top right corner of the Figure. A circular aperture 102 is situated on the extreme right end. Circular aperture 102 is positioned over heating element 140 to allow a cigarette access to the heating element. A slide aperture 104 is located to the left of aperture 102. Guide rails 106 are positioned to the left of slide aperture 104.

Figure 2B:
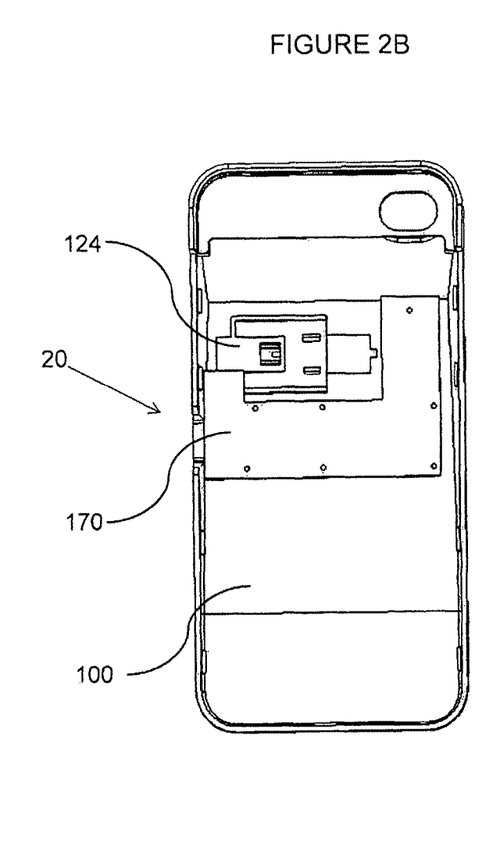
FIG. 2B is a view of FIG. 2A including the innovative mechanism.

FIG. 2B illustrates back panel 100 of FIG. 2A, now including the innovative heating mechanism. A PCB (printed circuit board) 170 is visible in the Figure. PCB 170 has mounted thereon an electric lighting mechanism 20 which includes a heating element 140, a micro USB port 180 and a switch 130, none of which are visible in the immediate Figure (see below FIGS. 8A-D). A slide carriage 124 is partially visible, located between back panel 100 and PCB 170.

Figure 3A:
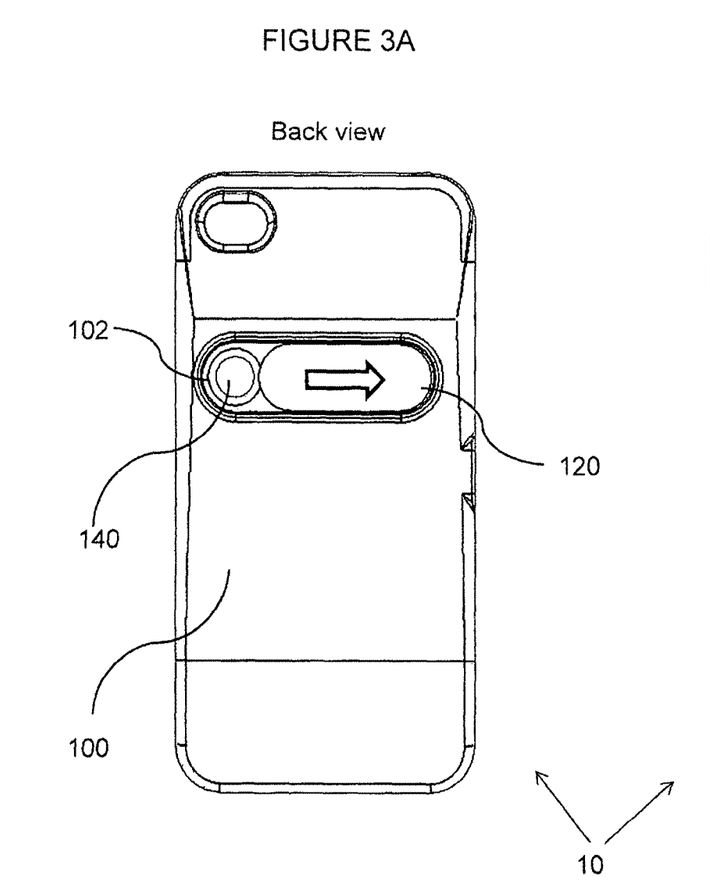
FIG. 3A is a back view of the back panel of FIG. 1.

FIG. 3A is a back view of an assembled cover 10 of the current exemplary embodiment of the invention. Slide shutter 120 is in a retracted state, revealing heating element 140 visible via aperture 102. An illustrative arrow points in the direction of retraction for slide shutter 120. In the current embodiment of the invention, heating element 140 is activated by retracting slide shutter 170 in the direction of the arrow. Additional details are discussed below, at least with reference to FIGS. 8A-D.

Figure 3B:
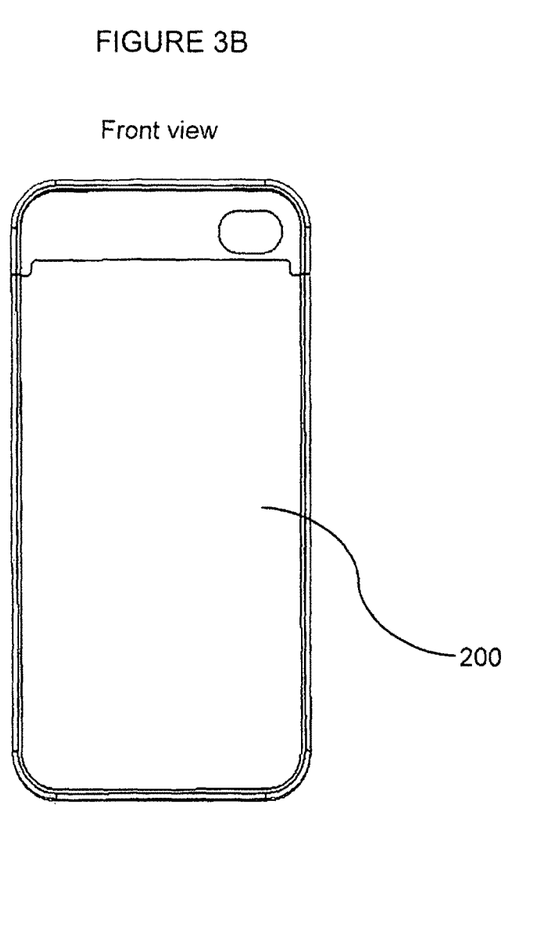
FIG. 3B is a front view of a front panel of an embodiment of the invention.
Figure 4:
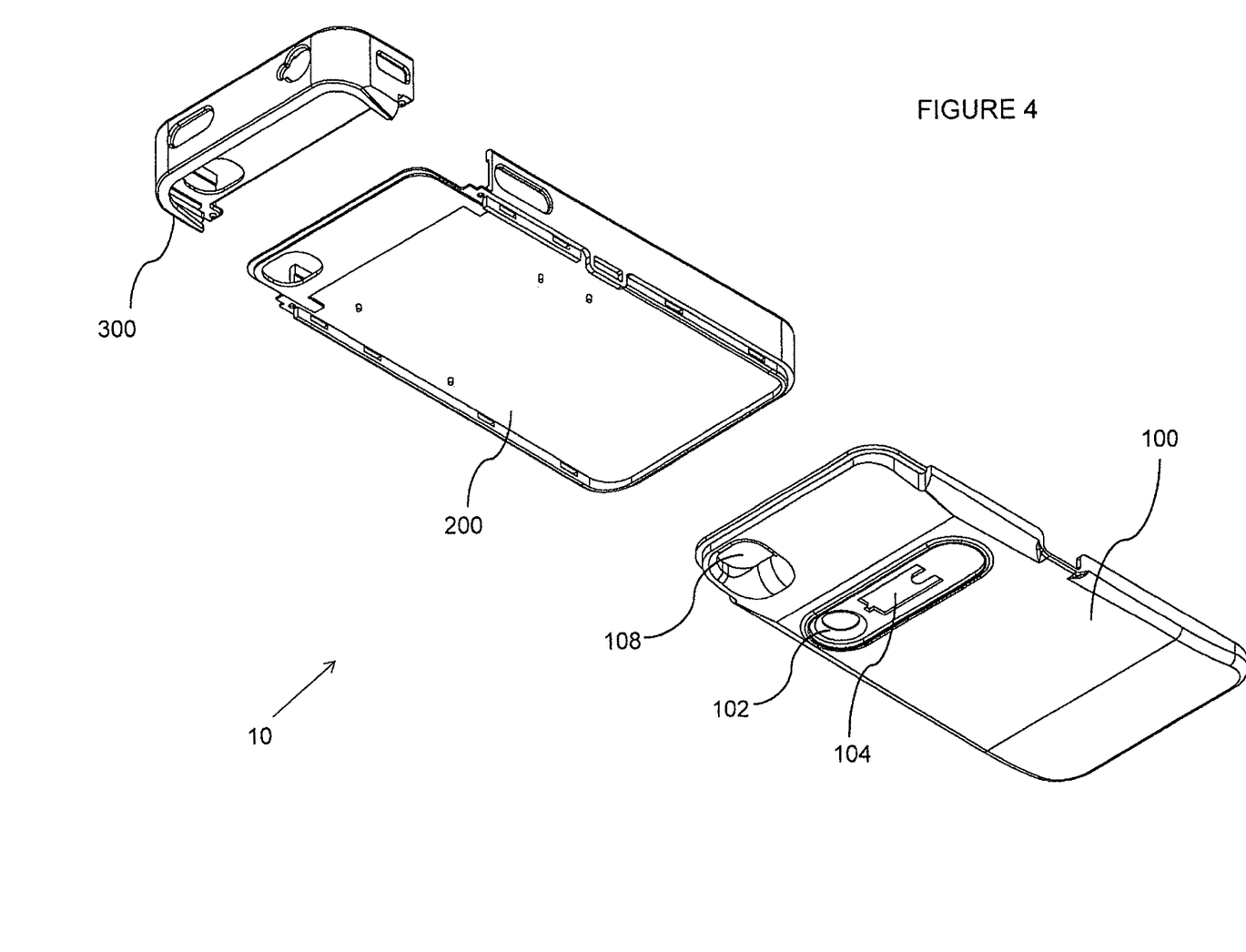
FIG. 4 is an exploded view of an exemplary mobile device cover of the invention.

FIG. 3B is a front view of assembled cover 10 of the currently depicted embodiment of the invention. The back panel of a smartphone is positioned flush against the front face of front panel 200, when the smartphone (not shown) is inserted into the innovative cover, FIG. 4 is an exploded view of cover 10 of the invention without the innovative heating mechanism installed in back panel 100. Cover 10 includes innovative back panel 100, front panel 200 which holds and protects an inserted smartphone, and a top member 300 which helps to hold the smartphone in place and the panels together.

Figures 5A, 5B, 5C, 5D:
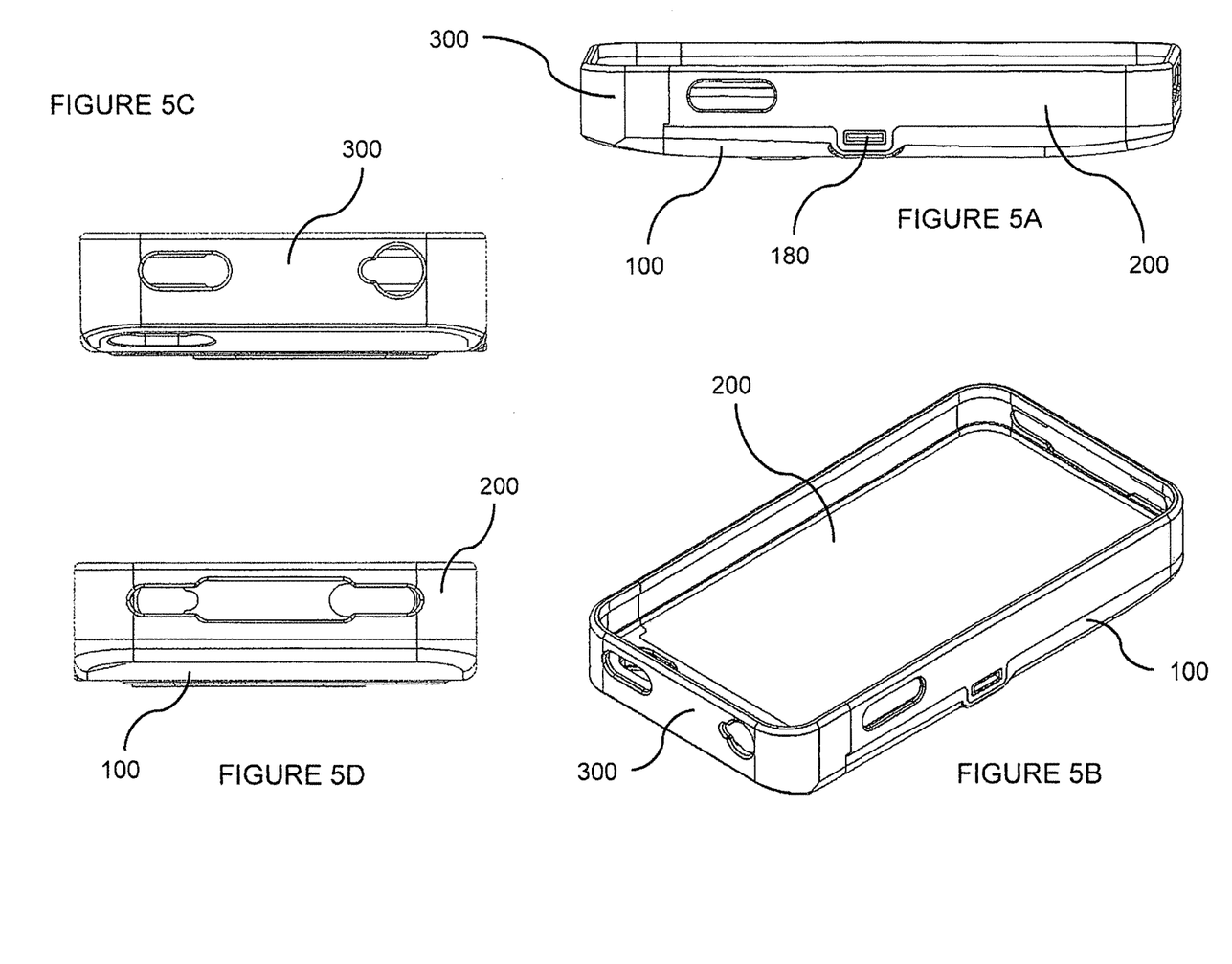
FIG. 5A-5D are various views of the exemplary device cover of FIG. 4.

FIG. 5A illustrates a side view of cover 10. FIG. 5B illustrates an isometric view of cover 10. Micro USB port 180 is visible in the Figure as well as in FIG. 5A. (It is clear that a mini USB port can be used interchangeably with micro USB port 180, but that the smaller form factor of micro USB 180 is preferable so as to keep the overall thickness of the cover as thin as possible.) FIG. 5C illustrates a top view of cover 10 i.e. top member 300 (openings for the On/Off button and headphone jack are clearly visible). FIG. 5D illustrates a bottom view of the cover. An aperture for a charger is visible in the Figure.

Figure 6A:
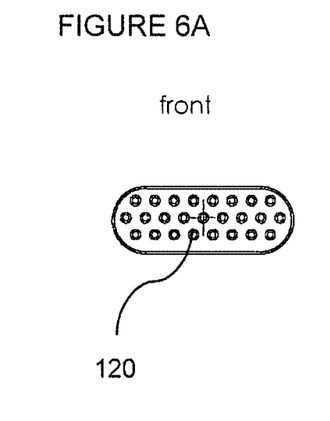
FIG. 6A-6D are various views of the slide shutter of an embodiment of the invention.
Figure 6B:
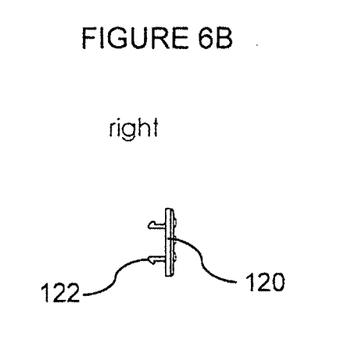
Figure 6C:
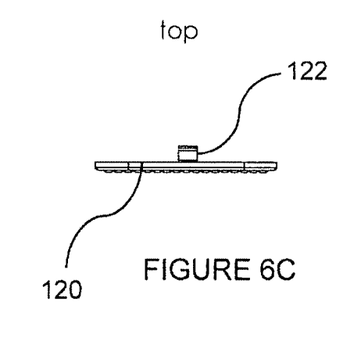
Figure 6D:
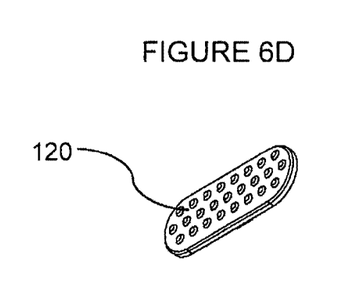

FIG. 6A illustrates a front view of slide shutter 120. FIG. 6B is a side view of the shutter 120. FIG. 6C is a top view of the shutter and FIG. 6D is an isometric illustration of shutter 120. Guide legs 122 are visible in FIGS. 6B and 6C.

Figure 7A:
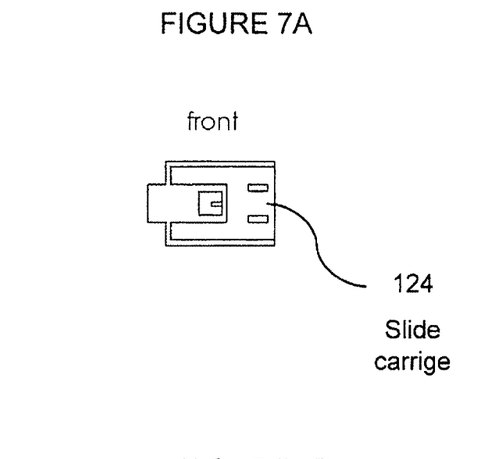
FIG. 7A-7B are various views of the slide carriage of an embodiment of the invention.
Figure 7B:
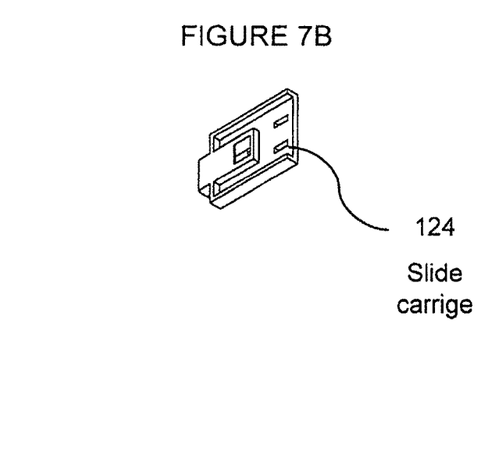

FIG. 7A depicts a front view of slide carriage 124 of the current embodiment of the invention. FIG. 7B is an isometric illustration of slide carriage 124. Slide shutter 120 interlocks with slide carriage 124 through aperture 104. Guide legs 122 lock into guide rails 106 (see FIG. 2A). Slide carriage 124 is biased in the direction of aperture 102 so that in the resting state, slide shutter 120 covers aperture 102 and heating element 140.

Figure 8A:
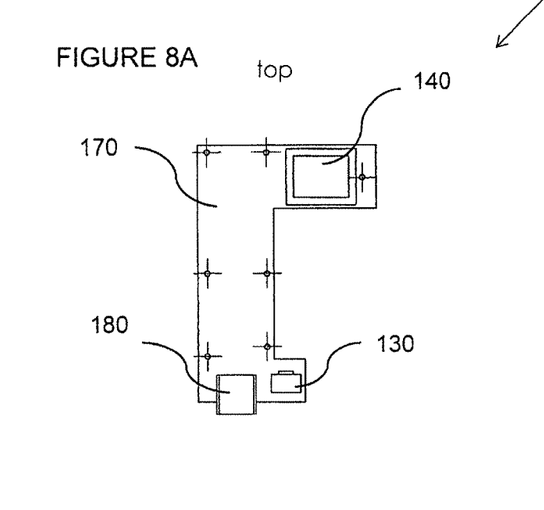
FIG. 8A-8D are various views of the lighting mechanism of an embodiment of the invention.
Figure 8B:
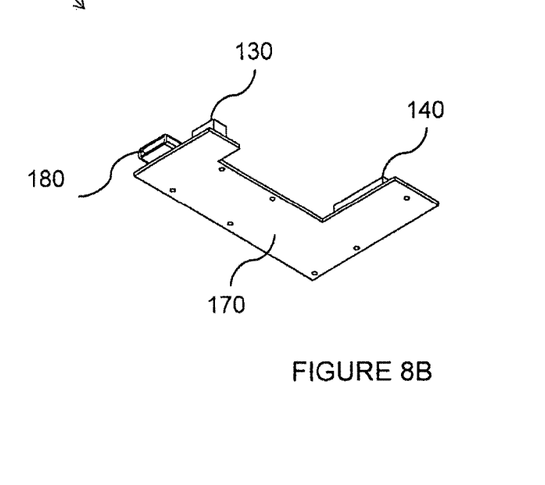
Figure 8C:
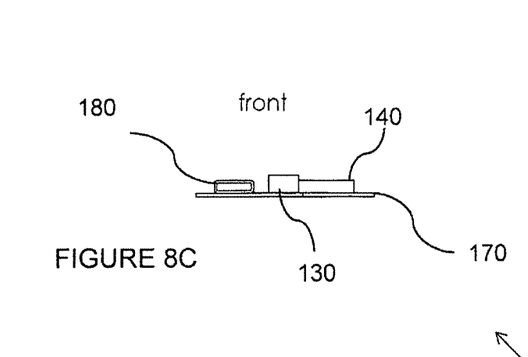
Figure 8D:
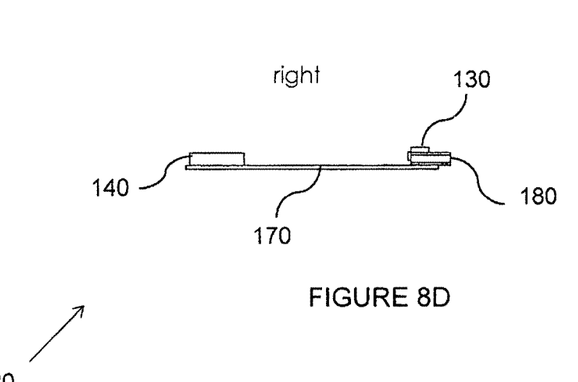

FIG. 8A illustrates a top, plan view of lighting mechanism 20. FIG. 8B is an isometric illustration of lighting mechanism 20. FIG. 8C is a front view of lighting mechanism 20. FIG. 8D is a side view of lighting mechanism 20. PCB 170 is an exemplary substrate upon which heating element 140, micro USB port 180 and switch 130 are mounted. In use, heating element 140 and switch 130 are operationally coupled together a battery (not shown). When switch 130 is actuated, heating element 140 is powered until reaching a sufficient heat to light a cigarette. In the depicted embodiment, switch 130 is actuated by depressing a biased plunger. The plunger is depressed by slide carriage 124 when slide shutter 120 is retracted to reveal heating element 140 as shown in FIG. 3A. Micro USB port 180 is adapted to receive a power cord from a wall socket or other battery source (even from the battery of a mobile device seated in cover 10) to power the battery of lighting mechanism 20.

While the invention has been described with respect to a limited number of embodiments, it will be appreciated that many variations, modifications and other applications of the invention may be made. Some of the envisioned embodiments have been discussed previously, while many other would be obvious to those skilled to in the art. Therefore, the claimed invention as recited in the claims that follow is not limited to the embodiments described herein.

What is claimed is:

1. A mobile device accessory with integrated portable electric cigarette lighter comprising:
   (a) a mobile device cover including a lip adapted to frictionally engage at least two peripheral edges of said mobile device and adapted to house said mobile device in such a manner that said mobile device can be removed there-from and replaced therein; and
   (b) an electric lighter mechanism irremovably built into a back panel of said mobile device cover, said electric lighter mechanism including:
      (i) a heating device, built in fixed relation to said back panel,
      (ii) a power source, and
      (iii) an actuator, adapted to activate said heating device by operationally coupling said heating device to said power source; and
      (iv) a slide shutter, said slide shutter biased in a direction such that in a resting state, said slide shutter hides said heating device and in an activated state said slide shutter reveals said heating device and actuates said actuator, said slide shutter adapted to reversibly expose said heating device, wherein said slide shutter is further adapted to actuate said actuator when exposing said heating device.

2. The mobile device accessory of claim 1, wherein said power source is an independent power source.

3. The mobile device accessory of claim 2, wherein said independent power source is selected from the group including: a rechargeable battery, a non-rechargeable battery, a solar powered battery, and a combination of any of the above.

4. The mobile device accessory of claim 2, wherein said lighting mechanism further includes:
   (iv) a power port, adapted to receive a line from a power source to charge said independent power source.

5. The mobile device accessory of claim 4, wherein said power port is further adapted to charge a power source of a mobile device encased in said protective accessory.

6. The mobile device accessory of claim 4, wherein said power port is selected from the group comprising: a mini Universal Serial Bus (USB) port and a micro USB port.

7. The mobile device accessory of claim 1, wherein said power source is adapted to receive power from said mobile device encased in said protective accessory.

8. The mobile device accessory of claim 7, further comprising:
   (c) a coupling mechanism adapted to couple said encased mobile device to said heating device.

9. The mobile device accessory of claim 1, wherein said protective accessory is a mobile device case.

10. The mobile device accessory of claim 1, wherein said slide shutter is further adapted to actuate said actuator when hiding said heating device from view.

11. The mobile device accessory of claim 1, wherein said actuator is a slide shutter adapted to reversibly expose said heating device.

12. The mobile device accessory of claim 1, wherein said mobile device cover further includes a top member configured to removably engage an open edge of said front panel, such that in an engaged state said mobile device is immobilized in said mobile device cover.

13. The mobile device accessory of claim 1, wherein said mobile device cover further comprises: a front panel, said front panel operationally coupled to said back panel, said front panel including said lip and wherein said front panel is interposed between said back panel and said mobile device.

* * * * *